US012798762B2

(12) United States Patent
Letonnelier et al.

(10) Patent No.: US 12,798,762 B2
(45) Date of Patent: Nov. 17, 2026

(54) ELECTRICAL FLIGHT CONTROL SYSTEM FOR AIRCRAFT

(71) Applicant: AIRBUS HELICOPTERS, Marignane Cedex (FR)

(72) Inventors: Clément Letonnelier, La Fare les Oliviers (FR); Pascal Izzo, Berre L'etang (FR); Antoine Maussion, La Fare les Oliviers (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 0 days.

(21) Appl. No.: 19/415,193

(22) Filed: Dec. 10, 2025

(65) Prior Publication Data

US 2026/0167324 A1 Jun. 18, 2026

(30) Foreign Application Priority Data

Dec. 12, 2024 (FR) ....................................... 2413948

(51) Int. Cl.
*B64C 13/50* (2006.01)
*B64C 13/04* (2006.01)
*B64C 13/18* (2006.01)

(52) U.S. Cl.
CPC ............ *B64C 13/505* (2018.01); *B64C 13/04* (2013.01); *B64C 13/18* (2013.01)

(58) Field of Classification Search
CPC ........ B64C 13/505; B64C 13/04; B64C 13/18
See application file for complete search history.

(56) References Cited

U.S. PATENT DOCUMENTS 8,761,969 B2 * 6/2014 Sghairi ................. B64C 13/503 701/4
2006/0100750 A1 * 5/2006 Platzer ................. G05D 1/0077 701/3

(Continued)

FOREIGN PATENT DOCUMENTS

| | | | |
|---|---|---|---|
| EP | 3008533 | A2 | 4/2016 |
| WO | 2014199070 | A2 | 12/2014 |
| WO | 2014199070 | A3 | 4/2015 |

OTHER PUBLICATIONS

French Search Report for French Application No. FR2413948, Completed by the French Patent Office, Dated Nov. 24, 2025, 9 pages.

(Continued)

*Primary Examiner* — Tye William Abell
(74) *Attorney, Agent, or Firm* — BROOKS KUSHMAN P.C.

(57) ABSTRACT

An electrical flight control system for controlling an aircraft. The flight control system comprises a plurality of functional subassemblies each having at least one primary computer and at least one dissimilar secondary computer, at least one functional subassembly being a simplex/duplex subassembly comprising at least three identical simplex primary computers and at least one duplex secondary computer, each duplex secondary computer of a simplex/duplex subassembly comprising an independent and synchronized control calculation channel and a monitoring calculation channel, each simplex primary computer of a simplex/duplex subassembly having a single calculation channel, and wherein, except in the event of failure, the three primary computers of a simplex/duplex subassembly form two virtual pseudo-duplex computers.

16 Claims, 9 Drawing Sheets

(56) References Cited

U.S. PATENT DOCUMENTS

| | | | | |
|---|---|---|---|---|
| 2010/0204853 A1* | 8/2010 | Sghairi | B64C 13/503 | 701/4 |
| 2016/0122003 A1* | 5/2016 | Bara | B64C 13/505 | 701/3 |
| 2023/0227174 A1* | 7/2023 | Cadotte | B64D 45/00 | 701/3 |

OTHER PUBLICATIONS

Extended European Search Report for European Patent Application No. 25221798.9-1201, completed by the European Patent Office, dated May 27, 2026, 18 pages (including English machine translation).

* cited by examiner

ELECTRICAL FLIGHT CONTROL SYSTEM FOR AIRCRAFT

CROSS REFERENCE TO RELATED APPLICATION

This application claims priority to FR 24 13948 filed on Dec. 12, 2024, the disclosure of which is incorporated in its entirety by reference herein.

TECHNICAL FIELD

The present disclosure relates to an electrical flight control system for an aircraft.

BACKGROUND

An aircraft may comprise moving aerodynamic control surfaces controlled by an electrical flight control system in order to steer the aircraft. Such aerodynamic control surfaces may comprise rotor blades, propeller blades, ailerons or rudders for example.

An electrical flight control system may comprise a plurality of piloting command acquisition subassembly for acquiring a piloting command. Each piloting command acquisition subassembly may be integrated into a piloting member that can be operated by a pilot, such as a control stick for example, in order to encode a command following the operation of the piloting member. Moreover, the flight control system comprises a processing subassembly determining a positional setpoint to be reached by one or more aerodynamic control surfaces in the required manner as a function of at least one command encoded by a subassembly for acquiring a piloting command and the current situational state of the aircraft. Such a positional setpoint may be a pitch angle of a blade, a deflection angle of a flap or a speed of rotation of a rotor or a propeller, for example. Finally, the flight control system comprises at least one actuating subassembly controlling an actuator acting on one or more aerodynamic control surfaces as a function of a positional setpoint determined by the processing subassembly.

The first aircraft with electrical flight control comprised an electrical flight control system arranged in parallel with an emergency mechanical flight control system to allow manual landing in the event of failure of the electrical flight control system. Although effective, such an architecture may have the disadvantage of being heavy and bulky.

Alternatively, an aircraft may comprise an electrical flight control system with a high level of safety so as not to require mechanical redundancy.

For such a flight control system, certification regulations impose a failure occurrence rate less than or equal to $10^{-9}$/flight-hour, that leads to a failure occurrence rate less than or equal to $10^{-10}$/flight-hour for each subassembly.

Current solutions for electrical flight control systems therefore use sub-assemblies with synchronous duplex architectures. Each subassembly comprises a plurality of duplex computers. The expression “duplex computer” refers here and hereinafter to a computer that has two independent calculation channels, the execution of which is synchronized, unlike a simplex computer that has only one calculation channel. The expression “calculation channel” refers to a digital and/or analog processing unit that makes it possible to perform calculations on quantities represented digitally and/or analogically. The processing unit can perform digital processing with a processor or other forms of integrated circuit including logic circuits. The processing unit may perform analog processing with analog components integrated or not in integrated circuits such as, for example, operational amplifiers. The term “processor” may refer equally to a central processing unit or CPU, a graphics processing unit or GPU, a digital signal processor or DSP, a microcontroller, etc. For example, a duplex computer may comprise two calculation channels each having a processor, whereas a simplex computer comprises a single calculation channel having, for example, one processor.

A synchronous duplex computer comprises a calculation channel hereinafter referred to as a “control calculation channel” used to generate the desired output, and a calculation channel hereinafter referred to as “monitoring calculation channel” responsible for monitoring the operation of the control calculation channel in parallel and invalidating it if a fault is detected.

Document US2006/100750 discloses an electrical flight control system of this type.

Document EP3008533 describes an architecture with triple redundancies of duplex computers for each of the subassemblies. In addition, this architecture comprises secure unidirectional links between the subassemblies.

Such an architecture having subassemblies comprising synchronous duplex computers may prove to be bulky.

In addition, equipment of the subassemblies of an electrical flight control system of an aircraft may be part of a Master Minimum Equipment List (MMEL). This list defines the list of equipment that may be inoperative for the flight, the conditions to be met to allow a flight in accordance with the objectives of the certification authorities and the number of days or hours of flight authorized from the discovery of the failure. This additional condition gives rise to other constraints and, in particular, leads to the attainment of a failure occurrence rate for the flight control system that is less than or equal to a value of between $10^{7}$ and $10^{-8}$/flight-hour with a failed reference item of equipment, i.e., a failure occurrence rate of the subassemblies that is less than or equal to a value of between $10^{-8}$ and $10^{-9}$/flight-hour with a failed reference item of equipment. It should be noted that an item of equipment for which the failure occurrence probability is less than an acceptability threshold, typically $10^{-5}$/flight-hour, is not considered. In other words, it is accepted that the failure of an item of equipment having a failure rate below the acceptability threshold leads to immobilization of the aircraft.

Consequently, each subassembly must therefore have a failure occurrence rate of $10^{-10}$/flight-hour under normal conditions and, where applicable, of $10^{-8}$ to $10^{-9}$/flight-hour under MMEL conditions, namely if the flight is authorized for a certain number of flight-hours in the event of failure of a reference item of equipment of the subassembly.

Documents US 2023/0227174 and U.S. Pat. No. 8,761,969 are likewise known.

SUMMARY

Therefore, one object of the present disclosure is to provide an innovative electrical flight control system.

The disclosure thus relates to an electrical flight control system for controlling an aircraft, the flight control system comprising a plurality of functional subassemblies, the plurality of functional subassemblies comprising a processing subassembly determining at least one positional setpoint to be achieved by at least one aerodynamic control surface as a function of at least one command, the plurality of functional subassemblies comprising at least one actuating subassembly configured to generate, as a function of said positional setpoint, at least one actuation setpoint that is transmitted to at least one actuator, Each functional subassembly comprises at least one primary computer and at least one secondary computer that are dissimilar, at least one functional subassembly being a simplex/duplex subassembly comprising at least three identical simplex primary computers and at least one duplex secondary computer, each duplex secondary computer of a simplex/duplex subassembly comprising independent and synchronized control calculation channel and monitoring calculation channel, each simplex primary computer of a simplex/duplex subassembly having a single calculation channel, and wherein, except in the event of failure, the three primary computers of a simplex/duplex subassembly form two virtual pseudo-duplex computers.

The terms "primary" and "secondary" in the expressions "primary computer" and "secondary computer" are used to distinguish the two dissimilar types of computers. The expressions "primary computer" and "secondary computer" may be replaced respectively by "computer of a first type" and "computer of a second type".

For example, an aerodynamic control surface may take the form of a blade of a rotor, a positional setpoint being a pitch angle or a speed of rotation of the rotor. According to another example, an aerodynamic control surface may take the form of a flap, such as a rudder or aileron, a positional setpoint being an angle of deflection of the flap with respect to a reference.

The term "each" associated with a member is used both in the presence of one member and of a plurality of members, for the sake of clarity of the description. Thus the expression "each duplex secondary computer of a simplex/duplex subassembly comprising independent and synchronized control calculation channel and monitoring calculation channel" means that the one or more duplex secondary computers of a simplex/duplex subassembly all comprise independent and synchronized control calculation channel and monitoring calculation channel.

The expression "virtual pseudo-duplex computer" indicates that one simplex computer of a simplex/duplex subassembly in particular performs the function of a control calculation channel of a conventional duplex computer, and that another computer of this simplex/duplex subassembly in particular performs the function of a monitoring calculation channel of a conventional duplex computer. Thus, one computer of this simplex/duplex subassembly generates the desired output and another computer determines whether or not this output is erroneous.

Therefore, each simplex/duplex subassembly comprises at least four computers. Each simplex computer of such a subassembly typically has a failure occurrence rate less than or equal to $10^{-4}$/flight-hour, that results in a failure occurrence rate less than or equal to $10^{-10}$/flight-hour under normal conditions for this subassembly.

In addition, each functional subassembly comprises so-called "primary" computers and one or more so-called "secondary" computers that are dissimilar, that contributes to obtaining the desired failure occurrence rates by taking into consideration the probability of occurrence of a common mode failure.

The dissimilarities are "physical" dissimilarities, for example through the use of different component suppliers, different PCB manufacturers or the like, and "software" dissimilarities, for example through different sets of instructions, different algorithms, different programming languages, or the like.

In order to improve the dissimilarities, the links with the other subassemblies respectively of the one or more primary and secondary computers of a subassembly can follow different routes within the aircraft to avoid common failure modes.

Compared to the prior art, the disclosure thus offers, for each simplex/duplex subassembly, an additional level of technological dissimilarity with the implementation of simplex and duplex computers. Such a simplex/duplex subassembly can also meet the constraints related to the MMEL conditions as explained below.

Thus, each simplex/duplex subassembly can have a failure occurrence rate of less than $10^{-10}$/flight-hour, while having an optimized dissimilarity level, or even an optimized cost and/or size. Such a simplex/duplex subassembly can then make it possible to optimize the cost, volume, and/or mass of the system, in particular because of the use of simplex computers.

The electrical flight control system may also comprise one or more of the following features, taken individually or in combination.

According to one possibility, the at least three primary computers of a simplex/duplex subassembly can form two virtual pseudo-duplex computers by being configured as follows: a first primary computer is configured to generate a first order, a second primary computer is configured to generate a second order and to monitor the first primary computer in a manner that is not synchronized with the first primary computer, and a third primary computer is configured to monitor the first primary computer and the second primary computer in an unsynchronized manner.

The three primary computers of a simplex/duplex subassembly then comprise a single calculation channel, but such a calculation channel may be configured to be able to provide a control function and/or at least one monitoring function, as a function of the current situation. Thus, if a simplex/duplex subassembly forms the processing subassembly, the first order and the second order each take the form of a positional setpoint intended for the same aerodynamic control surface. Finally, the third primary computer then applies instructions to asynchronously verify the operation of the first primary computer and the second primary computer. Thus, the first primary computer and the second primary computer jointly form a virtual duplex computer, and the second primary computer and the third primary computer jointly form another virtual duplex computer.

The primary computers of a simplex/duplex subassembly form two virtual pseudo-duplex computers, possibly at low cost, with optimized mass, and/or optimized size, via conventional cross-monitoring methods that are not described because they are part of the knowledge of a person skilled in the art.

Optionally, in the event of failure of a primary computer of a simplex/duplex subassembly, each of the two operating primary computers of this simplex/duplex subassembly can automatically reconfigure to respectively generate the first order and the second order and to monitor the other primary computer.

In order to improve the failure resistance of a primary computer of a simplex/duplex subassembly, in particular before take-off, a dynamic reconfiguration can be implemented so as to always obtain two computers each monitored by another computer.

According to one possibility compatible with the preceding possibilities, the simplex/duplex subassembly may comprise three identical simplex primary computers and two identical duplex secondary computers.

Such a simplex/duplex subassembly makes it possible to meet the safety level constraints under MMEL conditions with a primary or secondary computer having failed before take-off.

If the simplex/duplex subassembly does not have to meet the MMEL conditions, by choice of the manufacturer, then it is possible to arrange a single secondary computer.

According to one possibility compatible with the preceding possibilities, the processing subassembly may comprise a simplex/duplex subassembly, at least two primary computers and each secondary computer of the processing subassembly each generating said positional setpoint, except in the event of failure.

The simplex and duplex computers of the processing subassembly are then each responsible for determining a positional setpoint for the same aerodynamic control surface as a function of the command received.

According to one possibility compatible with the preceding possibilities, the primary and secondary computers of each actuating subassembly communicate with each other and are configured to determine a positional setpoint to be applied from among the positional setpoints transmitted by the processing subassembly as a function of a stored selection logic.

This selection logic is implemented in a known manner by the computers of the actuating subassembly as a function of a validity state of the computers of the processing subassembly, these validity states being transmitted by the computers of the processing subassembly, as well as, for example, by conventional data consolidation/verification methods. By default, only the positional setpoint emitted by a predetermined computer is used. If this computer is deemed to be defective, only the positional setpoint emitted by another predetermined computer is used, and so on until there is only one selectable computer left, in which case no selection change is made. Optionally, the actuating subassembly first addresses the primary computers one after the other in a pre-established order, and then the secondary computers in a pre-established order, or vice versa.

The selection logic can be consolidated in a conventional manner between the computers of the actuating subassembly in order to harmonize the emitted actuating setpoints, each actuator being controlled by all the computers of the associated actuating subassembly. In order to do this, the computers of the actuating subassembly are configured to exchange with each other, through unidirectional or bidirectional inter-computer exchange links that can be of various technologies, directions, numbers or interconnections.

According to one possibility compatible with the preceding possibilities, the flight control system may comprise a plurality of actuators, said plurality of functional subassemblies comprising one actuating subassembly per actuator.

Thus, the processing subassembly may be configured to establish sets of positional setpoints transmitted to respective actuation subassemblies, each actuating subassembly controlling a dedicated actuator.

Alternatively, at least one processing subassembly may be configured to establish sets of positional setpoints transmitted to a plurality of actuating subassemblies.

According to one possibility compatible with the preceding possibilities, said plurality of functional subassemblies may comprise at least one piloting command acquisition subassembly for acquiring said command from an operation of an associated piloting member that can be operated by a pilot.

For example, said piloting command acquisition subassembly is incorporated in the associated piloting member.

For example, a helicopter comprises a collective pitch control stick incorporating its own piloting command acquisition subassembly and a cyclic pitch control stick incorporating its own piloting command acquisition subassembly. The two piloting command acquisition subassemblies communicate with the processing subassembly, this processing subassembly emitting, as a function of the commands received, sets of positional setpoints transmitted to actuating subassemblies.

Alternatively or additionally, said flight control system may comprise an antenna configured to receive said command and transmit it to the processing subassembly, and/or said flight control system may comprise an autopilot device configured to generate said command and transmit it to the processing subassembly.

According to one possibility compatible with the preceding possibilities, each computer of the piloting command acquisition subassembly can be connected by at least one first control link to each primary computer of the processing subassembly, each computer of the piloting command acquisition subassembly being connected by at least one second control link to each control calculation channel and to each monitoring calculation channel of each secondary computer of the processing subassembly, each first control link being dissimilar from each second control link.

The links between the computers of the possible piloting command acquisition subassembly and the primary computers of the processing subassembly are dissimilar from the links between the computers of the piloting command acquisition subassembly and the secondary computers of the processing subassembly in order to improve dissimilarity.

For example, each first control link is a unidirectional link and each second control link is a bidirectional link. In another example, each first control link is a bidirectional link and each second control link is a unidirectional link.

For example, the unidirectional links may be of the type referred to as unidirectional TIA/EIA-485, TIA/EIA-422 or ARINC 429, and the bidirectional links may be buses, for example of the type referred to as CAN, MIL-STD-1553, bidirectional TIA/EIA-485, AFDX, Time-Triggered Ethernet, FlexRay or LIN.

In another example, each first control link is a bidirectional link and each second control link is a bidirectional link that is dissimilar from each first control link.

According to one possibility compatible with the preceding possibilities, the piloting command acquisition subassembly may comprise:

- either, according to a first variant, two identical simplex primary computers as well as two identical simplex secondary computers that are dissimilar from the two simplex primary computers (51, 52), the two primary computers (51, 52) and the two secondary computers (53, 54) of the piloting command acquisition subassembly (A) each acquiring said command, the two primary computers (51, 52) and the two secondary computers (53, 54) of the piloting command acquisition subassembly (A) each having a single calculation channel; or
- according to a second variant, a simplex/duplex subassembly, at least two primary computers and each secondary computer of the piloting command acquisition subassembly acquiring said command, except in the event of failure; or
- according to a third variant, two identical duplex primary computers as well as two identical duplex secondary computers that are dissimilar from the two duplex primary computers, the two duplex primary computers and the two duplex secondary computers of the piloting command acquisition subassembly each acquiring said command and each having independent control calculation channel and monitoring calculation channel; or according to a fourth variant, a duplex primary computer and a duplex secondary computer that are dissimilar, the duplex primary computer and the duplex secondary computer of the piloting command acquisition subassembly each acquiring said command and each having independent control calculation channel and monitoring calculation channel.

Each computer of the piloting command acquisition subassembly is configured to acquire the command information, coming from a piloting member such as a stick for example, and to transmit it through the exchange links, to all the computers of the processing subassembly. The data are provided to the single calculation channel of each simplex computer and to each calculation channel of the one or more duplex computers, if applicable, to allow the implementation of conventional monitoring mechanisms of the commands received.

According to the first variant embodiment of the piloting command acquisition subassembly, the use of four simplex computers dissimilar per pair offers an increased level of dissimilarity, that makes it possible to meet the safety level constraints under MMEL conditions with a primary or secondary computer having failed before take-off. This first variant embodiment of the piloting command acquisition subassembly can induce a significant reduction in the cost/volume/mass of the system with fewer electronic components and links.

The second variant embodiment of the piloting command acquisition subassembly is also of interest.

The third variant embodiment of the piloting command acquisition subassembly comprises four duplex computers that make it possible to meet the safety level constraints under MMEL conditions with a primary or secondary computer having failed before take-off. The control calculation channel of each computer is monitored by its monitoring calculation channel that can invalidate it, for example in the usual manner by inhibiting the communication flow with the computer deemed defective. This variant provides increased fault detection.

The fourth variant is optimized for an aircraft that does not have to meet the safety level constraints under MMEL conditions with a computer having failed before take-off.

According to one possibility compatible with the preceding possibilities, the actuating subassembly may comprise:

either, according to a first variant, a simplex/duplex subassembly, at least two primary computers and each secondary computer of the actuating subassembly each generating, except in the event of failure, an actuating setpoint; or according to a second variant, two identical duplex primary computers and two identical duplex secondary computers that are dissimilar from the two primary computers, the two duplex primary computers and the two duplex secondary computers of the actuating subassembly each generating an actuation setpoint and each having independent control calculation channel and monitoring calculation channel; or according to a third variant, a duplex primary computer and a duplex secondary computer that are dissimilar, the duplex primary computer and the duplex secondary computer of the actuating subassembly each generating an actuation setpoint and each having independent control calculation channel and monitoring calculation channel.

The computers of each actuating subassembly are configured so that the one or more actuators act on the aerodynamic control surfaces, as a function of the positional setpoints emitted by the processing subassembly. All the variants offer an increased level of technological dissimilarity.

The first variant embodiment of the actuating subassembly provides additional technological dissimilarity with the asynchronous duplex operation induced by the simplex/duplex subassembly, and makes it possible to meet the safety level constraints under MMEL conditions with a primary or secondary computer having failed before take-off.

The second variant embodiment of the actuating subassembly is optimized in terms of size, and makes it possible to meet the safety level constraints under MMEL conditions with a primary or secondary computer having failed before take-off.

The third variant is optimized for an aircraft that does not have to meet the safety level constraints under MMEL conditions with a computer having failed before take-off.

According to one possibility compatible with the preceding possibilities: i) the processing subassembly may comprise a simplex/duplex subassembly having two secondary computers, two primary computers and each secondary computer of the processing subassembly each generating, except in the event of failure, said positional setpoint; ii) the piloting command acquisition subassembly may comprises two identical simplex primary computers and two identical simplex secondary computers that are dissimilar from the two primary computers of the piloting command acquisition subassembly, the two primary computers and the two secondary computers of the piloting command acquisition subassembly each generating said command, the two simplex primary computers and the two simplex secondary computers of the piloting command acquisition subassembly each having a single calculation channel, iii) the actuating subassembly may comprise two identical duplex primary computers and two identical duplex secondary computers that are dissimilar from the two primary computers of the actuating subassembly, the two duplex primary computers and the two duplex secondary computers of the actuating subassembly each generating an actuation setpoint and each having independent control calculation channel and monitoring calculation channel.

For each of the three subassemblies, dissimilar computers are used. Such a system is optimized in terms of size and/or weight and makes it possible to meet the safety level constraints under MMEL conditions with a primary or secondary computer having failed before take-off.

According to one possibility compatible with the preceding possibilities, each primary computer of the processing subassembly may be connected by a bidirectional primary link to each computer of the actuating subassembly, each secondary computer of the processing subassembly being able to be connected by at least one bidirectional secondary link to each computer of the actuating subassembly, each bidirectional primary link being different from each bidirectional secondary link.

The links between the computers of the processing subassembly and the actuating subassembly can be, for example, of the CAN, MIL-STD-1553, bidirectional TIA/EIA-485, AFDX, Time-Triggered Ethernet, FlexRay or LIN type.

According to one possibility compatible with the preceding possibilities, the computers of the processing subassembly can communicate with each other via a plurality of inter-computer links.

The computers of the processing subassembly may be configured in a conventional manner to communicate with each other, via unidirectional or bidirectional inter-computer exchange links that may be of various technologies, directions, numbers or interconnections, in order to consolidate the input information coming from the piloting command acquisition subassembly or from sensing elements used to evaluate the current state of the aircraft.

Furthermore, an aircraft provided with at least one mobile aerodynamic control surface for steering this aircraft may be provided with an electrical flight control system according to the disclosure.

BRIEF DESCRIPTION OF THE DRAWINGS

The disclosure and its advantages appear in greater detail from the following description of examples given by way of illustration with reference to the accompanying figures, wherein.

DETAILED DESCRIPTION

Elements present in more than one of the figures are given the same references in each of them.

Figure 1:
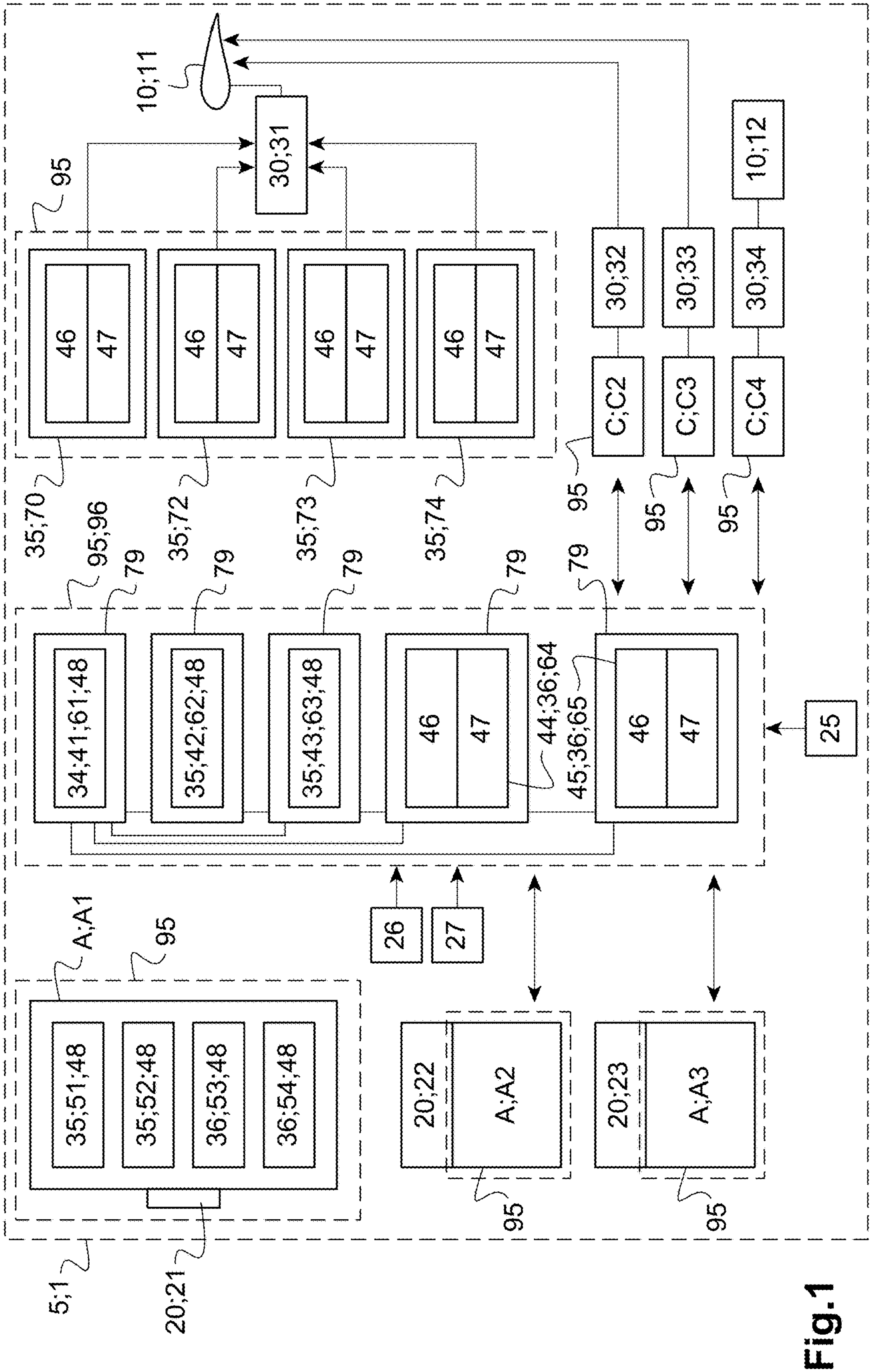
FIG. 1 is a view of a flight control system having a simplex/duplex subassembly according to the disclosure.

FIG. 1 shows an electrical flight control system 5 for an aircraft 1.

This electrical flight control system 5 comprises aerodynamic control surfaces 10 making it possible to steer the aircraft 1. According to the example of FIG. 1, the aircraft 1 is a rotorcraft comprising a main rotor provided with first variable-pitch blades 11 and a yaw motion control rotor 13 provided with second variable-pitch blades 12. According to the example in FIG. 17 described below, the aircraft 1 may be an unmanned aircraft provided with a plurality of variable speed rotors 13, 14. In another example, an aerodynamic control surface may, for example, be in the form of a movable flap.

Irrespective of the nature of the aerodynamic control surfaces 10 and of the manner of controlling them in order to steer the aircraft 1, the electrical flight control system 5 comprises a plurality of functional sub-assemblies 95 performing various functions.

Thus, the electrical flight control system 5 may comprise one or more functional sub-assemblies 95 of the piloting command acquisition subassembly type A, in order to generate a command. Each piloting command acquisition subassembly A has the function of acquiring a command emitted from a piloting member 20. A piloting command acquisition subassembly A may be incorporated in the associated control member 20, and may be connected to conventional sensors. Reference sign "A" designates any of the piloting command acquisition subassemblies illustrated, references "A1, A2, A3" designating specific subassemblies, if necessary.

According to the example illustrated, the electrical flight control system 5 comprises a collective pitch lever 21 for collectively controlling the pitch of the first blades 11 of the main rotor, the lever 21 being provided with at least one position sensor in communication with a first piloting command acquisition subassembly A1. The lever 21 may also be equipped with at least one button or equivalent in communication with the first piloting command acquisition subassembly A1.

The term "sensor" should be understood to mean a physical sensing element capable of directly measuring the parameter in question, but also a system that may comprise one or more physical sensing elements, as well as means for processing the signal that make it possible to provide an estimation of the parameter based on the measurements provided by these physical sensing elements.

According to the example illustrated, the electrical flight control system 5 comprises a cyclic pitch stick 22 for cyclically controlling the pitch of the first blades 11 of the main rotor, the stick 22 being provided with at least one position sensor in communication with a second piloting command acquisition subassembly A2. The stick 22 may also be equipped with at least one button or equivalent in communication with the second piloting command acquisition subassembly A2.

According to the example illustrated, the electrical flight control system 5 comprises a rudder bar 23 for collectively controlling the pitch of the second blades 12, the rudder bar 23 being provided with at least one position sensor in communication with a third piloting command acquisition subassembly A3.

According to one possibility, an antenna 26 or an autopilot device 27 can generate a command.

Independently of this aspect, the electrical flight control system 5 comprises a functional subassembly of the processing subassembly B type. The processing subassembly B has the function of determining at least one positional setpoint to be reached by at least one aerodynamic control surface, as a function of at least one command or even at least one situational measurement measured by a situational sensor 25. Such a situational sensor 25 may be one of the following sensors: a speed sensor measuring a speed of rotation of the rotor, an air speed sensor of the aircraft 1, an inertial unit, a radiosonde, a radar altimeter, a satellite positioning system of the aircraft 1, or other conventional sensors.

Moreover, the electrical flight control system 5 comprises at least one functional subassembly of the actuating subassembly C type having the function of generating at least one actuation setpoint transmitted to at least one actuator 30 as a function of at least one positional setpoint.

Each actuating subassembly C is configured to generate an actuating setpoint transmitted to at least one actuator 30 as a function of said corresponding positional setpoint. In the presence of a plurality of actuators 30, the electrical flight control system 5 may comprise one actuating subassembly per actuator 30. According to another example, the electrical flight control system 5 may comprise, in particular, an actuating subassembly controlling an actuator 30, for example for controlling the pitch of the blades of a tail rotor, and an actuating subassembly controlling a plurality of actuators 30, for example for controlling the pitch of the blades of a main rotor of a helicopter. Reference sign "C" designates any of the illustrated actuating subassemblies, the reference signs "C1, C2, C3" designating specific subassemblies, if necessary. Similarly, reference sign "30" designates any of the illustrated actuators, reference signs "31, 32, 33, 34" designating specific actuators, if necessary.

According to the illustrated example, the pitch of the first blades 11 may be controlled by three actuators 31, 32, 33 controlled by three respective actuating subassemblies C1, C2, C3. In addition, the pitch of the second blades 12 may be controlled by an actuator 34 controlled by its own actuating subassembly C4.

Independent of the number of actuating subassemblies C and the presence or absence of piloting command acquisition subassemblies A, each functional subassembly comprises a plurality of computers. The computers of the same functional subassembly may be arranged within the same piece of equipment.

More precisely, each functional subassembly comprises at least one computer referred to as a "primary computer 35" and at least one computer referred to as a "secondary computer 36" in order to be distinguished from a primary computer 35. Within the same functional subassembly, the one or more primary computers 35 are dissimilar from the one or more secondary computers 36. Reference sign "35" designates any of the primary computers, and reference sign "36" designates any of the secondary computers.

In addition, at least one of the functional subassemblies comprises a so-called "simplex/duplex subassembly 96". Each simplex/duplex subassembly 96 comprises at least three identical simplex primary computers 41, 42, 43 and at least one duplex secondary computer 44, 45. The one or more duplex secondary computers 44, 45 of a simplex/duplex subassembly 96 have control calculation channel 46 and monitoring calculation channel 47 that are independent and synchronized. Conversely, each simplex primary computer 41, 42, 43 of a simplex/duplex subassembly 96 has a single calculation channel.

In a general manner, reference sign 46 designates the control calculation channel of a duplex computer, and reference 47 designates the monitoring calculation channel of this same duplex computer. Similarly, reference sign 48 designates the single calculation channel of a simplex computer.

In the absence of a failure, the three primary computers 41, 42, 43 of a simplex/duplex subassembly 96 form two virtual pseudo-duplex computers.

Figure 2:
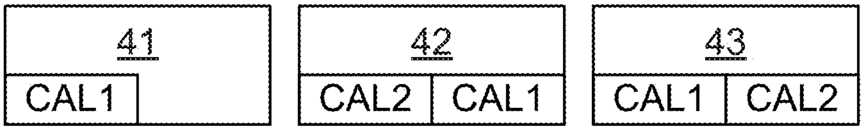
FIG. 2, is a view illustrating the three simplex computers of a simplex/duplex subassembly except in the event of failure.

According to FIG. 2, a first primary computer 41 is configured to execute instructions COM 1 in order to generate a first order in a conventional manner, for example a collective pitch angle to be reached. A second primary computer 42 is also configured to execute instructions COM 2 in order to generate a second order of the same type as the first order, that is also a collective pitch angle according to this example. Moreover, the second primary computer 42 verifies in a conventional and non-synchronized manner that the first primary computer 41 is operating normally by executing instructions MON1-1. Finally, the third primary computer 43 is configured to monitor, in an unsynchronized manner, the first primary computer 41 by executing instructions MON1-2 and the second primary computer 42 by executing instructions MON2. Thus, the first primary computer 41 and the second primary computer 42, and possibly also the third primary computer 43, together form a first virtual pseudo-duplex computer CAL1. Similarly, the second primary computer 42 and the third primary computer 43 together form a second virtual pseudo-duplex computer CAL2.

In the event of failure of a primary computer 41, 42, 43 of a simplex/duplex subassembly 96, the two operating primary computers 41, 42, 43 of this simplex/duplex subassembly are configured to automatically reconfigure in order to respectively generate the first order and the second order, and each monitor the other primary computer 41, 42, 43.

Figure 3:
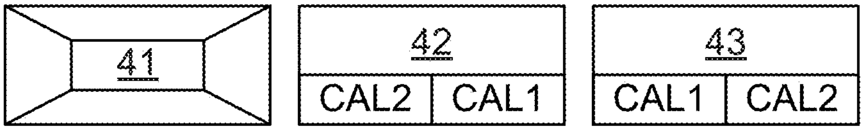
FIG. 3 is a view illustrating an automatic reconfiguration of the three simplex computers of a simplex/duplex subassembly in the event of failure of a first simplex computer.

According to FIG. 3, in the event of a failure detected in the usual manner of the first primary computer 41 of a simplex/duplex subassembly 96 by one of the other computers, the second primary computer 42 executes instructions COM2 to generate the second order and the third primary computer 43 executes instructions COM1 to generate the first order. Moreover, the second primary computer 42 executes instructions MON1 to monitor the third primary computer 43, and the third primary computer 43 executes instructions MON2 to monitor the second primary computer 42.

Figure 4:
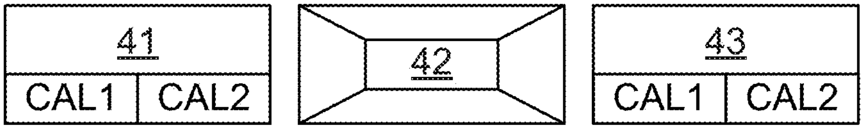
FIG. 4, is a view illustrating an automatic reconfiguration of the three simplex computers of a simplex/duplex subassembly in the event of failure of a second simplex computer.

According to FIG. 4, in the event of a failure detected in the usual manner of the second primary computer 42 of a simplex/duplex subassembly 96 by one of the other computers, the third primary computer 43 executes instructions COM2 to generate the second order and the first primary computer 41 executes instructions COM1 to generate the first order. Moreover, the third primary computer 43 executes instructions MON1 to monitor the first primary computer 41, and the first primary computer 41 executes instructions MON2 to monitor the third primary computer 43.

Figure 5:
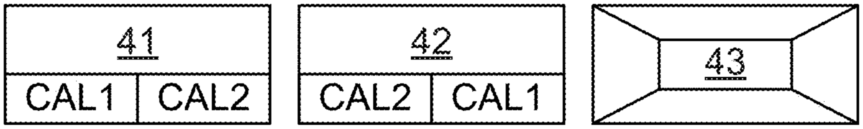
FIG. 5, is a view illustrating an automatic reconfiguration of the three simplex computers of a simplex/duplex subassembly in the event of failure of a third simplex computer.

According to FIG. 5, in the event of a failure detected in the usual manner of the third primary computer 43 of a simplex/duplex subassembly 96 by one of the other computers, the second primary computer 42 executes instructions COM2 to generate the second order and the first primary computer 41 executes instructions COM1 to generate the first order. Moreover, the second primary computer 42 executes instructions MON1 to monitor the first primary computer 41, and the first primary computer 41 executes instructions MON2 to monitor the second primary computer 42.

With reference to FIG. 1, in order to achieve the requirement levels under MMEL conditions, a simplex/duplex subassembly 96 comprises three identical simplex primary computers 41-43 and two identical duplex secondary computers 44-45. Reference signs 41-43 hereinafter generally designate the simplex primary computers of a simplex/duplex subassembly 96, and reference signs 44-45 hereinafter designate the duplex secondary computers of a simplex/duplex subassembly 96.

Furthermore, and as illustrated in FIG. 1, the processing subassembly B comprises a simplex/duplex subassembly provided with three primary computers 61, 62, 63 and one or two secondary computers 64, 65, two of the primary computers 61, 62, 63 and each secondary computer 64, 65 of the processing subassembly B each generating, except in the event of failure, a positional setpoint for the same actuator 30.

Figure 10:
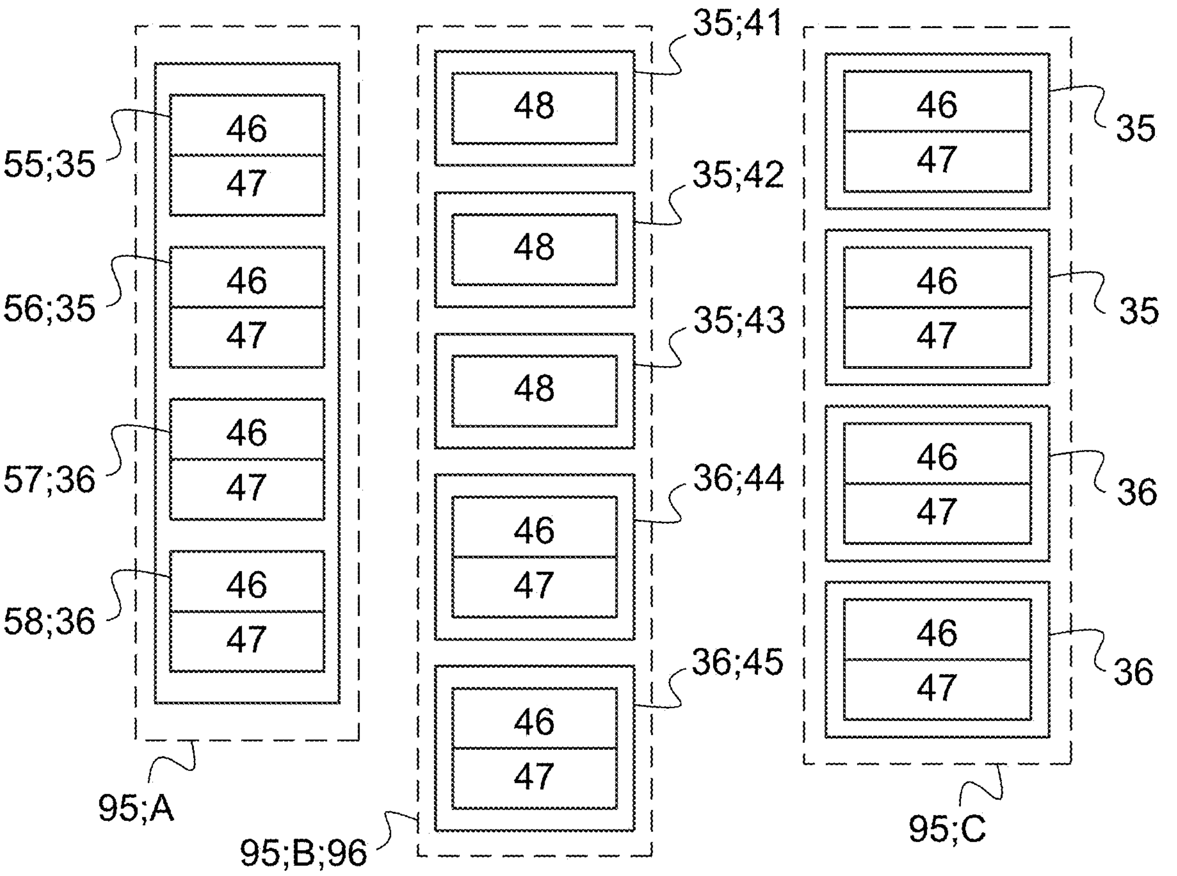
FIG. 10 is a view of a flight control system having a piloting command acquisition subassembly with duplex computers.
Figure 11:
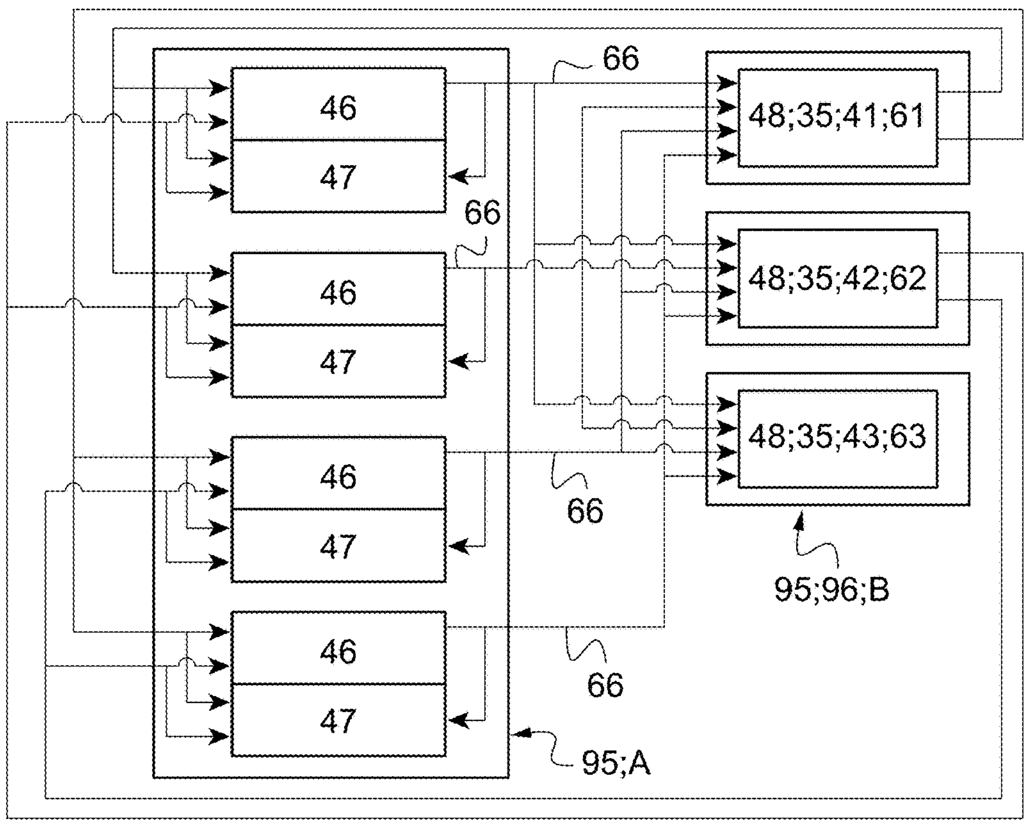
FIG. 11, is a view of the links between the piloting command acquisition subassembly and the simplex computers of the processing subassembly of FIG. 10.
Figure 12:
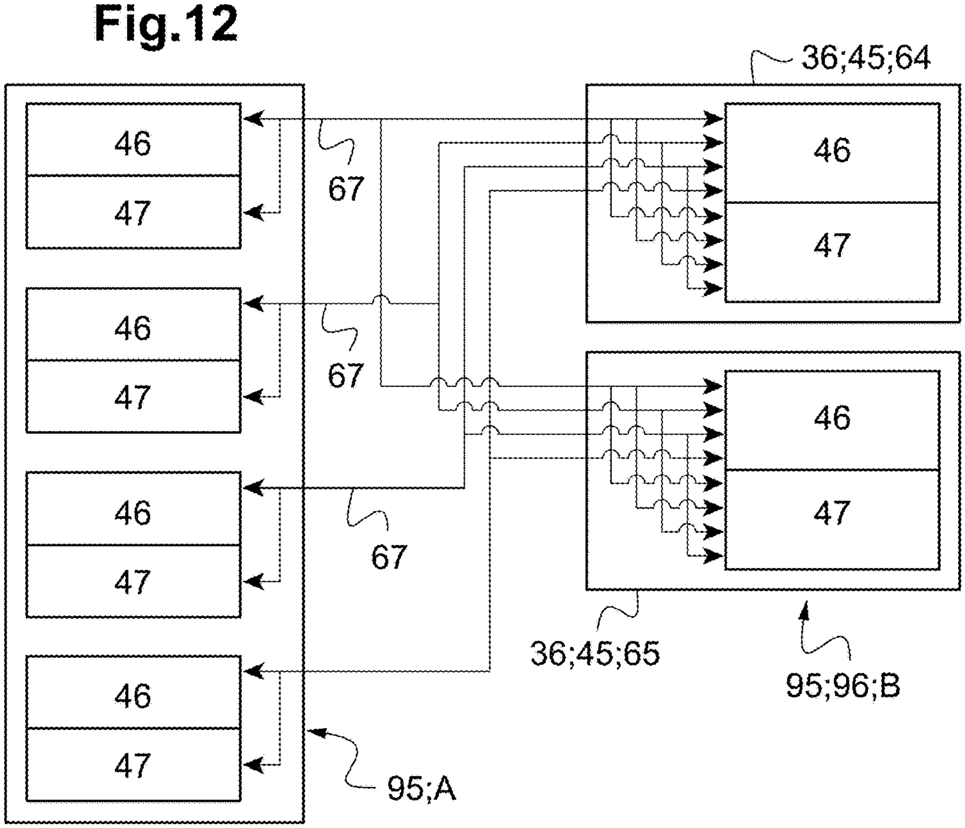
FIG. 12, is a view of the links between the piloting command acquisition subassembly and the duplex computers of the processing subassembly of FIG. 10.
Figure 13:
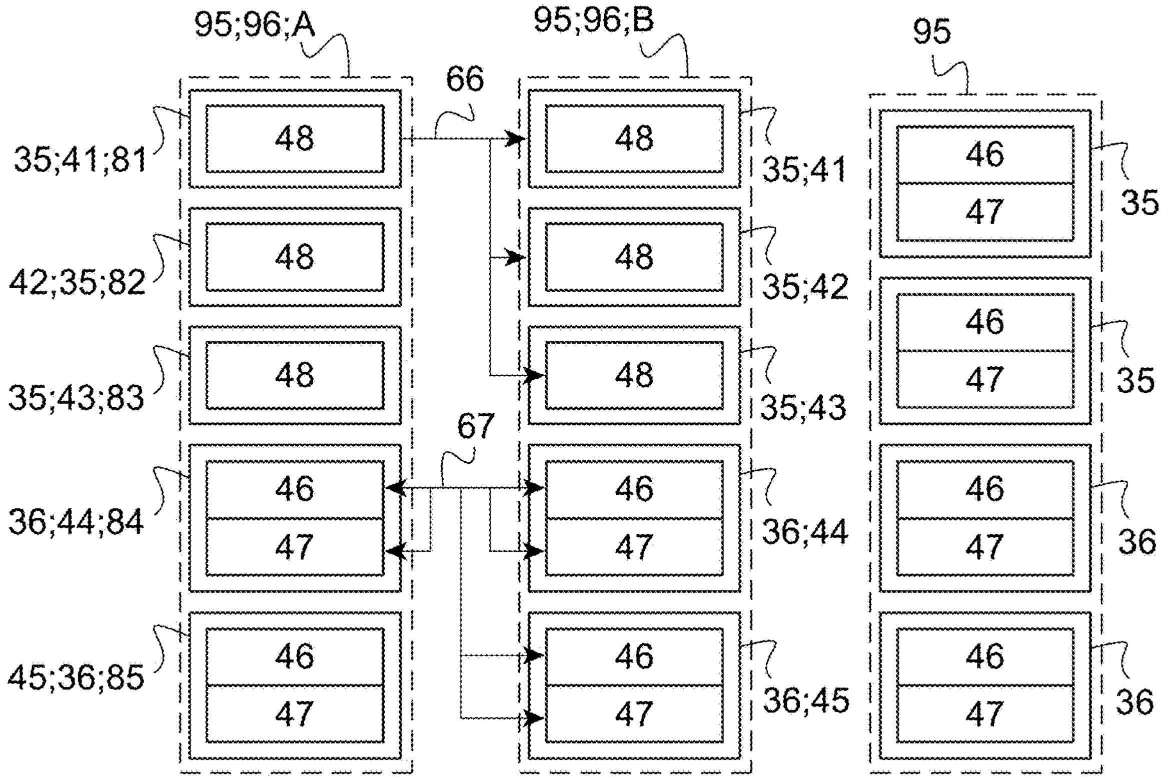
FIG. 13 is a view of a flight control system having a piloting command acquisition subassembly having a simplex/duplex subassembly.

The piloting command acquisition subassembly a may optionally comprise:

- according to the variant of FIG. 1, two identical simplex primary computers 51, 52 as well as two identical simplex secondary computers 53, 54 that are dissimilar from the two simplex primary computers 51, 52, the two primary computers 51, 52 and the two secondary computers 53, 54 of the piloting command acquisition subassembly A each acquiring said command, the two primary computers 51, 52 and the two secondary computers 53, 54 of the piloting command acquisition subassembly A each having a single calculation channel;
- according to the example of FIG. 13 described below, a simplex/duplex subassembly 96, at least two primary computers 81-83 and each secondary computer 84-85 of the piloting command acquisition subassembly A acquiring said command, except in the event of failure;
- according to the variant of FIG. 10 described below, two identical duplex primary computers 55, 56 as well as two identical duplex secondary computers 57, 58 that are dissimilar from the two duplex primary computers 55, 56, the two duplex primary computers 55, 56 and the two duplex secondary computers 57, 58 of the piloting command acquisition subassembly A each acquiring said command and each having control calculation channel and monitoring calculation channel that are independent; or
- a duplex primary computer 55 and a duplex secondary computer 57 that are dissimilar, the duplex primary computer 55 and the duplex secondary computer 57 of the piloting command acquisition subassembly A each acquiring said command and each having control calculation channel and monitoring calculation channel that are independent.

Figure 14:
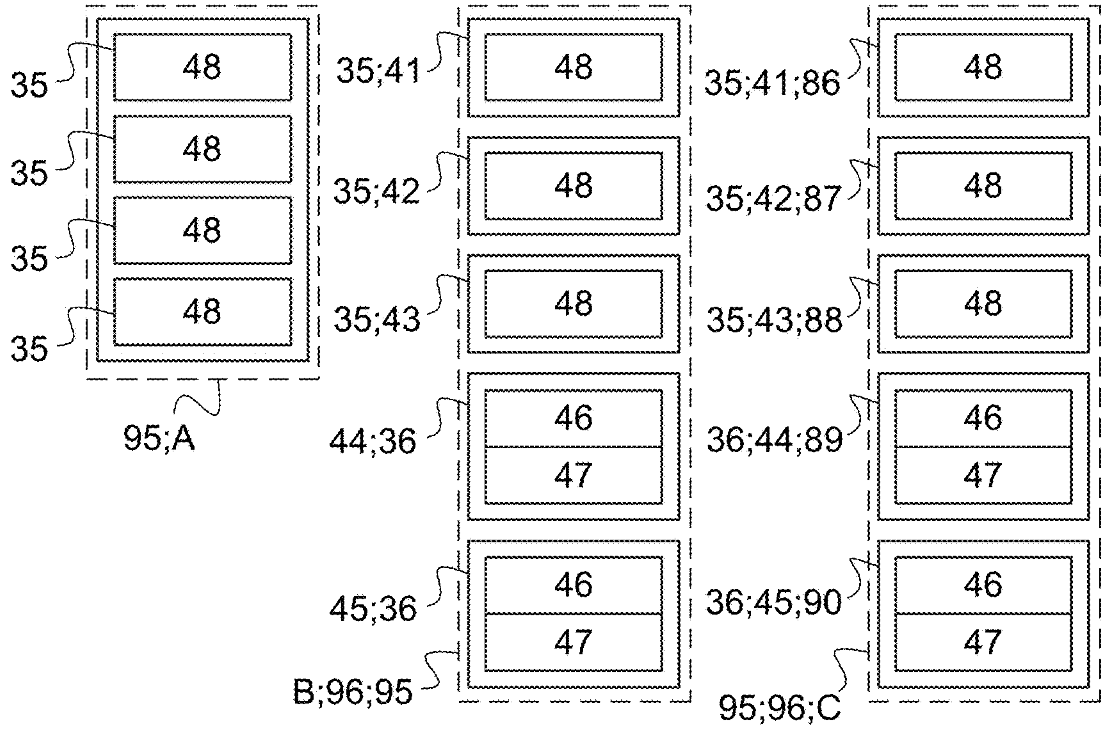
FIG. 14 is a view of a flight control system having an actuating subassembly having a simplex/duplex subassembly.
Figure 15:
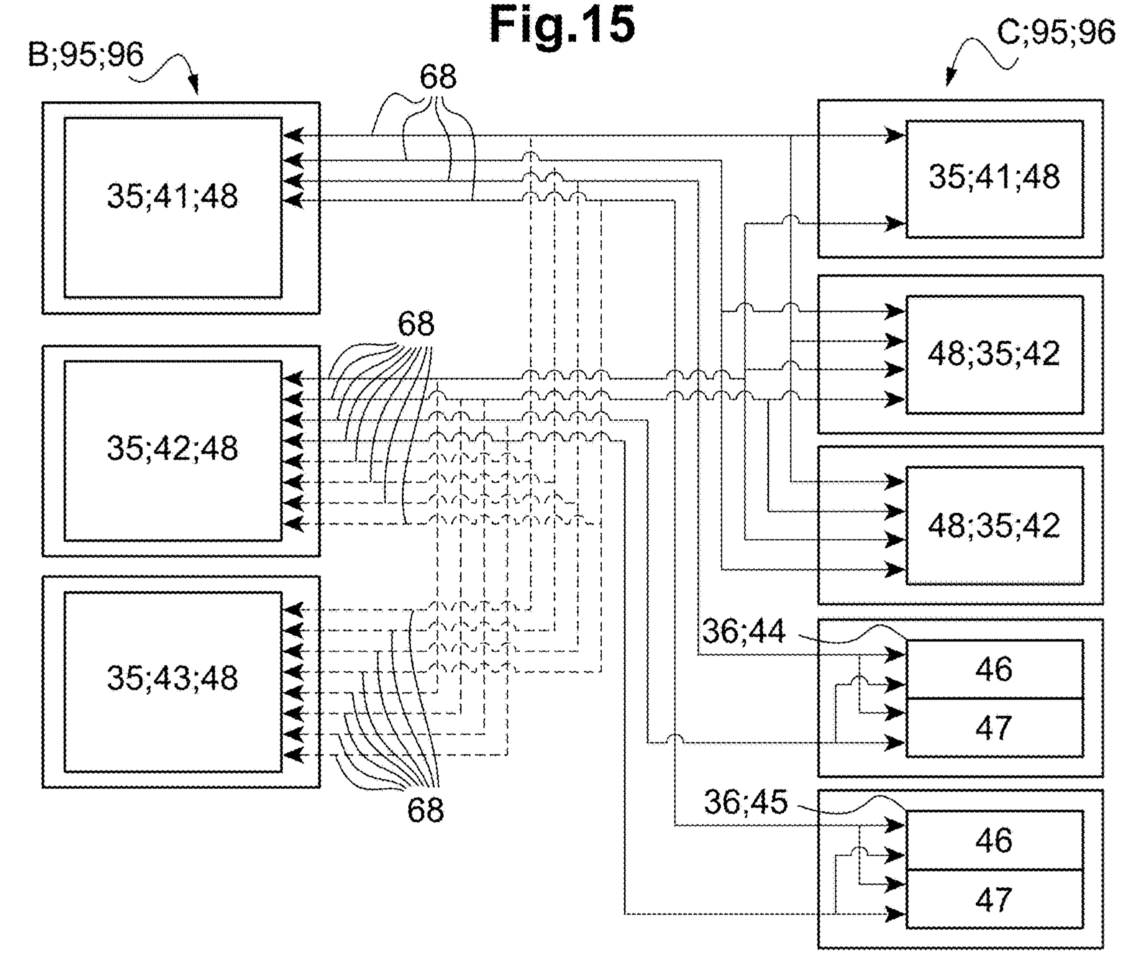
FIG. 15, is a view of the links between the actuating subassembly and the simplex computers of the processing subassembly of FIG. 14.
Figure 16:
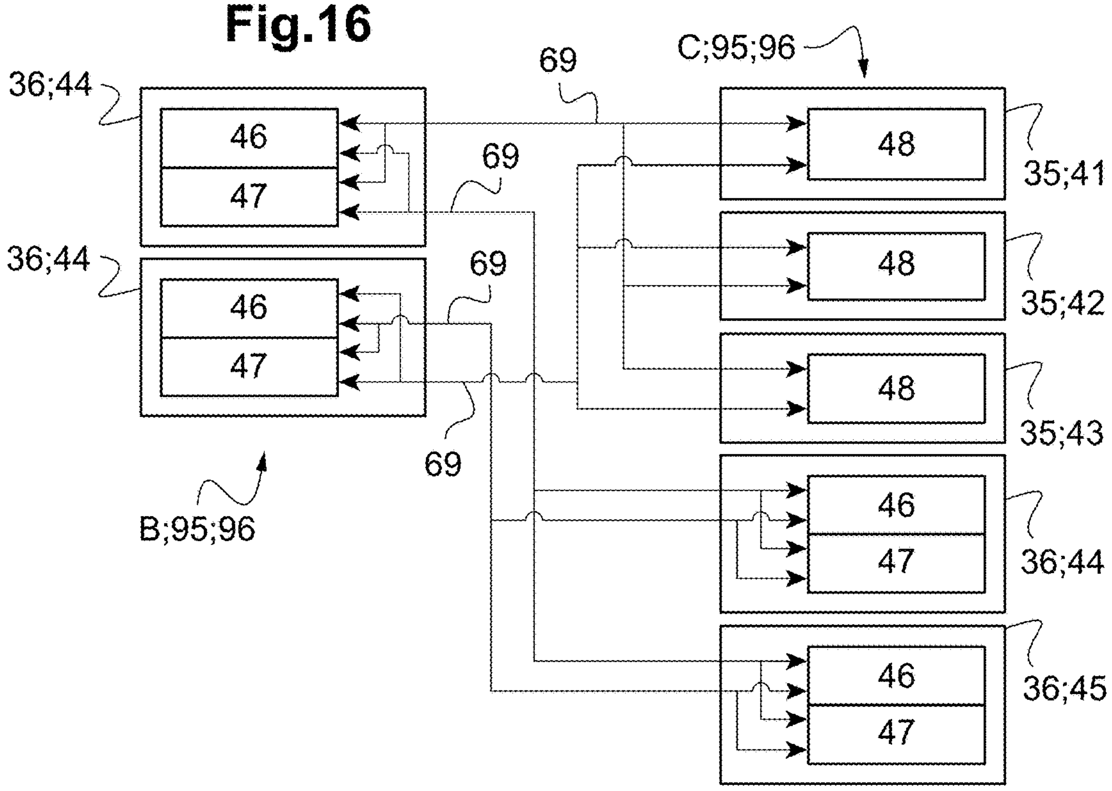
FIG. 16, is a view of the links between the actuating subassembly and the duplex computers of the processing subassembly of FIG. 14.
Figure 17:
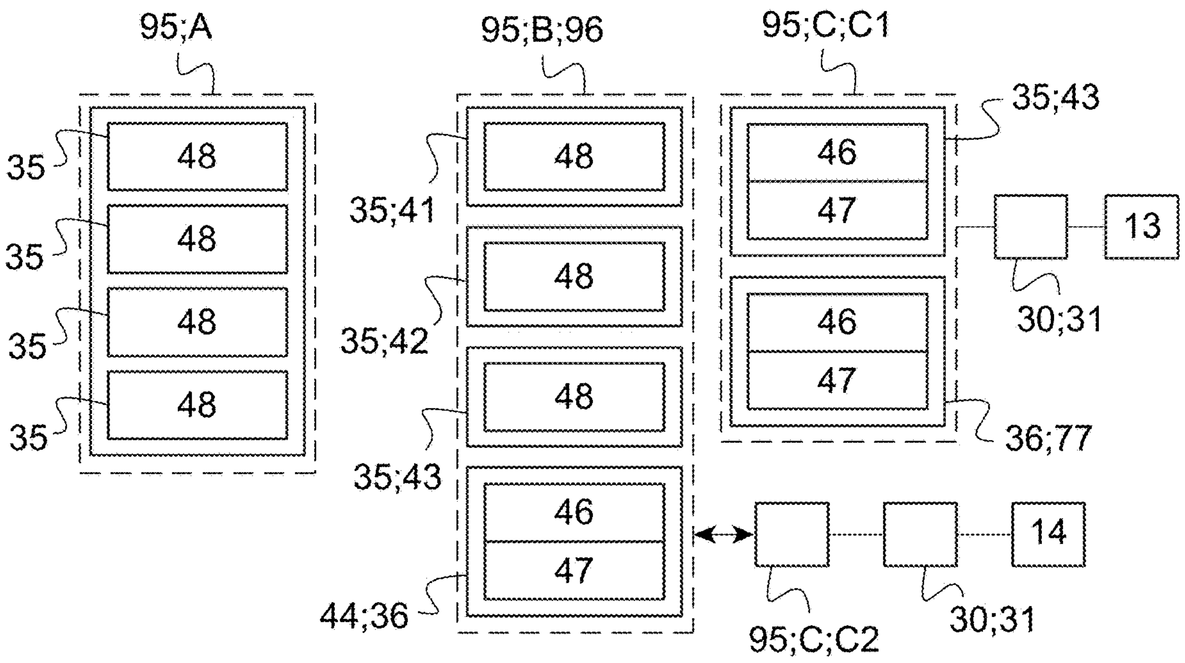
FIG. 17 is a view of a simplex/duplex subassembly having a single duplex computer.

According to another aspect, the actuating subassembly C optionally comprises:

- according to the variant illustrated in FIG. 14, a simplex/duplex subassembly 96, at least two primary computers 86-88 and each secondary computer 89-90 of the actuating subassembly C each generating, except in the event of failure, an actuating setpoint;
- according to the variant illustrated in FIG. 1, two identical duplex primary computers 71, 72 as well as two identical duplex secondary computers 73, 74 that are dissimilar from the two primary computers 71, 72, the two duplex primary computers 71, 72 and the two duplex secondary computers 73, 74 of the actuating subassembly C each generating an actuation setpoint and each having control calculation channel and monitoring calculation channel that are independent; or
- according to the variant illustrated in FIG. 17, a duplex primary computer 76 and a duplex secondary computer 77 that are dissimilar, the duplex primary computer 76 and the duplex secondary computer 77 of the actuating subassembly C each generating an actuation setpoint and each having control calculation channel and monitoring calculation channel that are independent.

Thus, according to the embodiment of FIG. 1:

- the processing subassembly B comprises a simplex/duplex subassembly 96 having three primary computers 61-63 and two secondary computers 64, 65, at least two primary computers 61-63 and each secondary computer 64-65 of the processing subassembly B each generating said positional setpoint, except in the event of failure;
- the piloting command acquisition subassembly A comprises two identical simplex primary computers 51, 52 as well as two identical simplex secondary computers 53, 54 that are dissimilar from the two primary computers 51, 52 of the piloting command acquisition subassembly A, the two primary computers 51, 52 and the two secondary computers 53, 54 of the piloting command acquisition subassembly A each generating said command, the two simplex primary computers 51, 52 and the two simplex secondary computers 53, 54 of the piloting command acquisition subassembly A each having a single calculation channel; and
- the actuating subassembly C comprises two identical duplex primary computers 71, 72 as well as two identical duplex secondary computers 73, 74 that are dissimilar from the two primary computers 71, 72 of the actuating subassembly C, the two duplex primary computers 71, 72 and the two duplex secondary computers 73, 74 of the actuating subassembly C each generating an actuation setpoint and each having independent control calculation channel and monitoring calculation channel.

Regardless of the composition of the actuating subassembly C and of the optional piloting command acquisition subassembly A, the computers of the piloting command acquisition subassembly A encode a command and transmit it to each calculation channel of the processing subassembly B.

Figure 6:
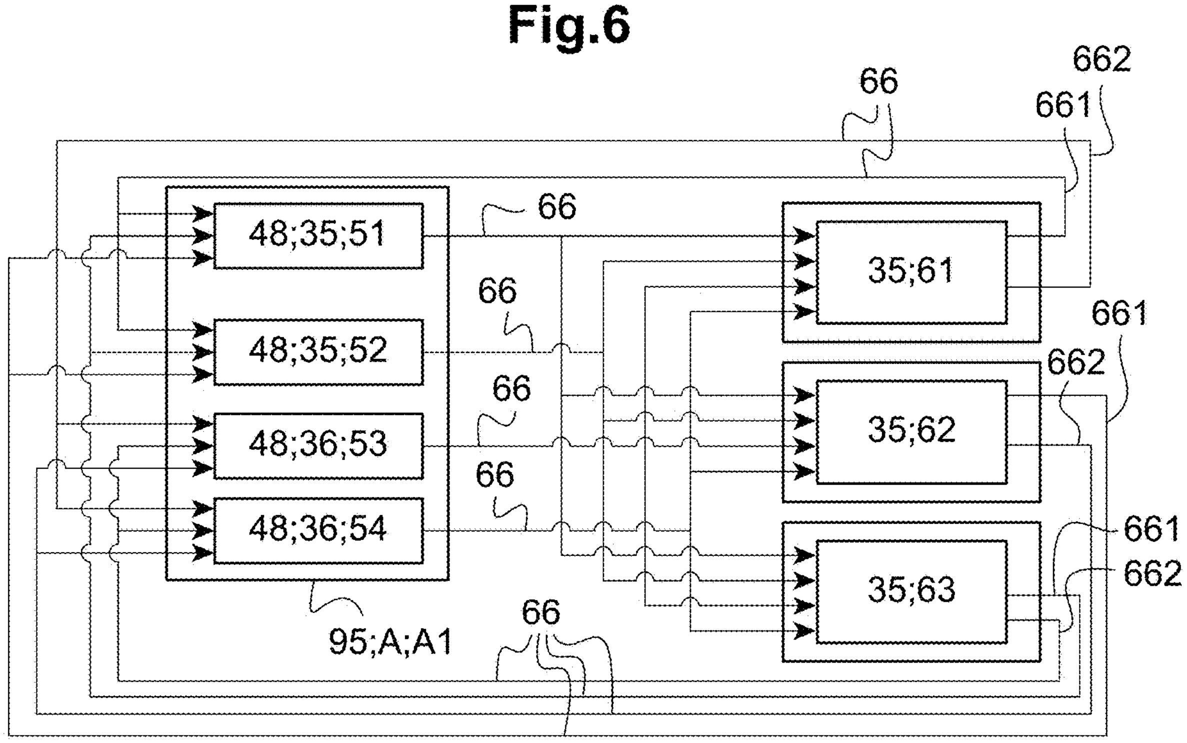
FIG. 6, is a view of the links between the piloting command acquisition subassembly and the simplex computers of the processing subassembly of FIG. 1.
Figure 7:
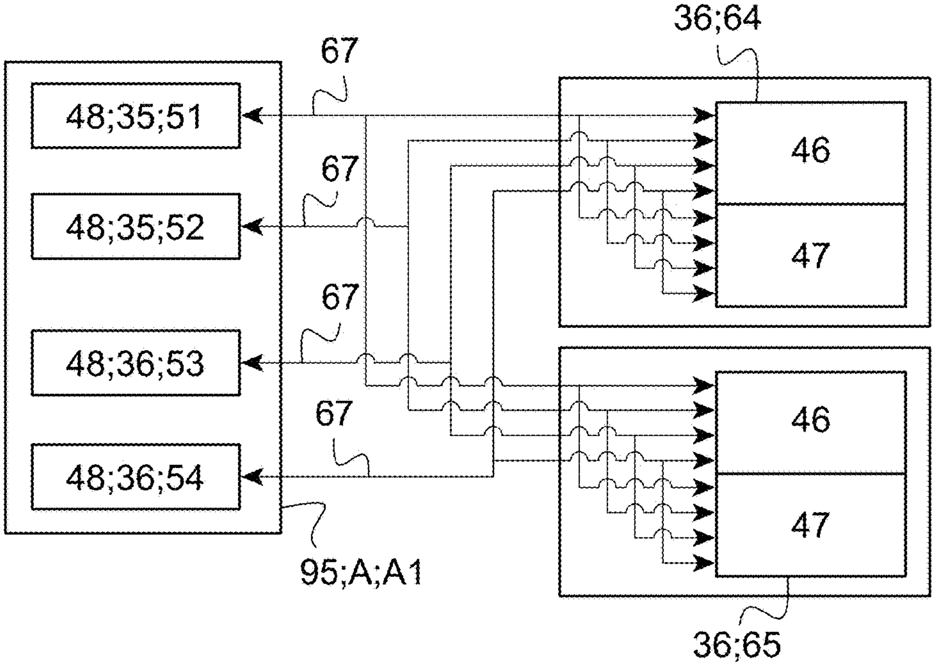
FIG. 7, is a view of the links between the piloting command acquisition subassembly and the duplex computers of the processing subassembly of FIG. 1.

For this purpose, each computer of the piloting command acquisition subassembly A is connected by at least one first control link 66 to each primary computer 35 of the processing subassembly B as illustrated in FIG. 6, or even by two first control links 66 in the presence of unidirectional links. In particular, at least the primary computers of the processing subassembly B having to calculate a setpoint, or even all the primary computers of the processing subassembly B according to the variant illustrated in FIG. 6 that allows a reconfiguration, can be connected to two unidirectional links 661, 662 respectively going to the primary computers and the secondary computers of the piloting command acquisition subassembly A. In addition, each computer of the piloting command acquisition subassembly A is connected by at least one second control link 67 to each control calculation channel 46 and to each monitoring calculation channel 47 of each secondary computer 36 of the processing subassembly B as illustrated in FIG. 7, or even by two second control links in the presence of unidirectional links. Each first control link 66 is dissimilar from each second control link 67.

According to FIG. 6, each first control link 66 is a unidirectional link and, according to FIG. 7, each second control link 67 is a bidirectional link. The reverse is also possible. According to another possibility, the first and second control links are bidirectional links of two different types.

Therefore, the computers 61-65 of the processing subassembly B communicate with each other through a plurality of inter-computer links 79 in order to evaluate the commands received in the usual manner.

In addition, at least two primary computers and the one or more secondary computers of the processing subassembly B each generate, in the usual manner, a positional setpoint as a function of the commands received and of the one or more measurements emitted by the one or more situational sensors 25.

The positional setpoints are then transmitted to the computers of the actuating subassembly C.

Figure 8:
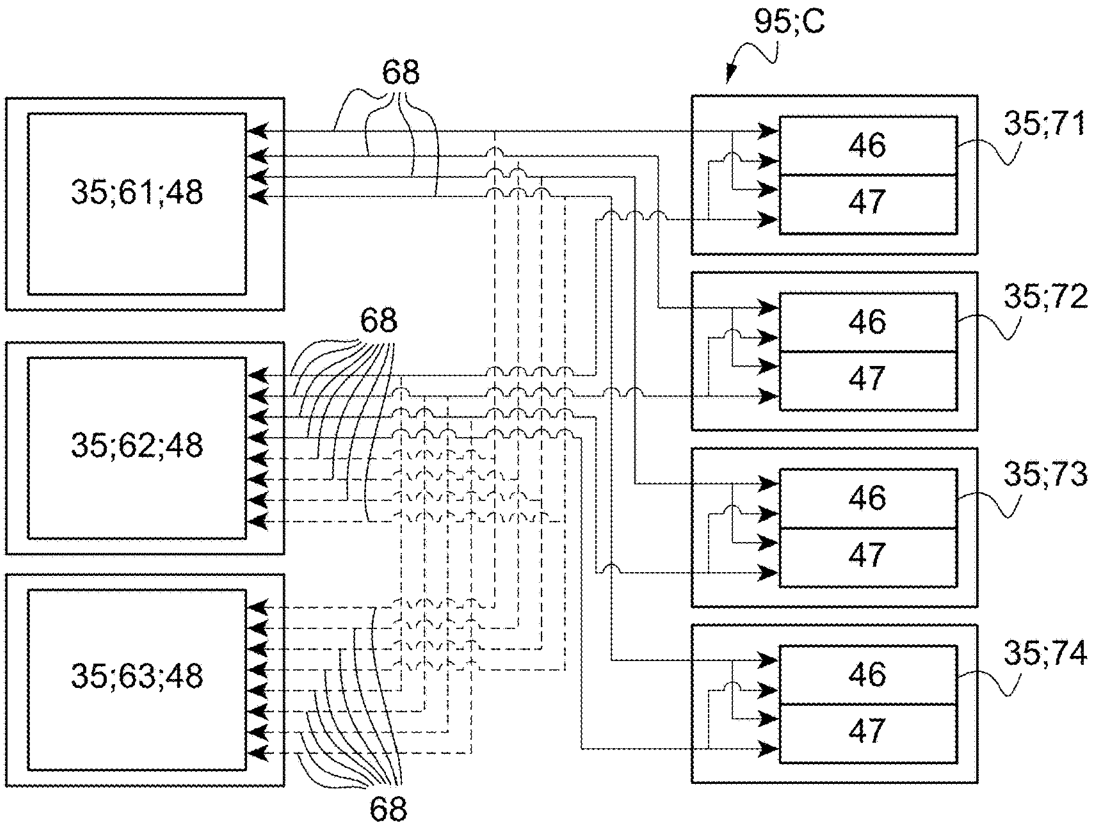
FIG. 8, is a view of the links between the actuating subassembly and the simplex computers of the processing subassembly of FIG. 1.

For this purpose, each primary computer of the processing subassembly B is connected by a bidirectional primary link 68 to each calculation channel of each computer of the actuating subassembly C as illustrated in FIG. 8, or even to each other primary computer of the processing subassembly B.

Figure 9:
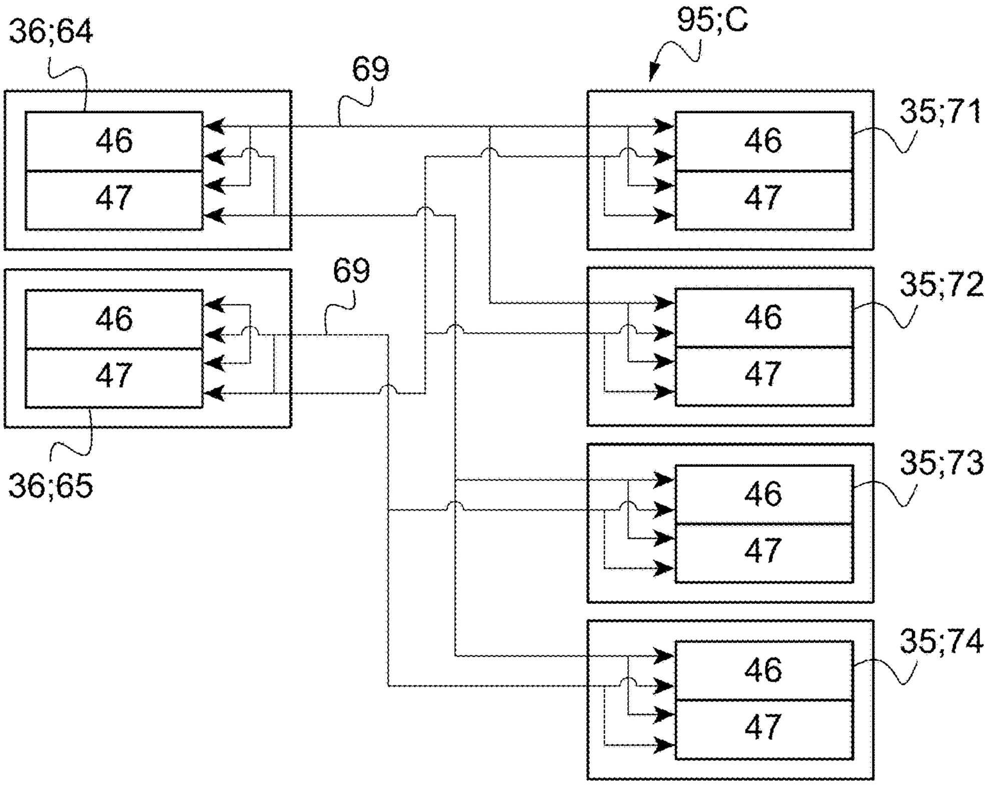
FIG. 9, is a view of the links between the actuating subassembly and the duplex computers of the processing subassembly of FIG. 1.

In addition, and with reference to FIG. 9, each channel of a secondary computer of the processing subassembly B is connected by a bidirectional secondary link 69 to each channel of each computer of the actuating subassembly C, each bidirectional primary link being different from each bidirectional secondary link. The monitoring calculation channel of a secondary computer can, in the usual manner, inhibit the transmission of a positional setpoint with its control calculation channel if a failure is detected.

Therefore, the computers of each actuating subassembly C communicate with one another in order to determine a positional setpoint to be applied from among the positional setpoints transmitted by the processing subassembly B as a function of a stored selection logic.

FIGS. 10 to 17 illustrate various variants.

According to FIG. 10, a piloting command acquisition subassembly A may comprise two dissimilar computers 55, 57 if the system does not need to meet the MMEL conditions, or even four duplex computers 55-58 dissimilar per pair if the system does need to meet the MMEL conditions, instead of the four simplex computers of FIG. 1. According to FIGS. 11 and 12, each control calculation channel of a duplex computer of the piloting command acquisition subassembly A communicates via bidirectional links with its monitoring calculation channel, with the simplex computers of the processing subassembly B and with each control calculation channel of each secondary computer of the processing subassembly B.

FIG. 13 illustrates a piloting command acquisition subassembly A comprising a simplex/duplex subassembly according to the disclosure. Only two links are illustrated for the sake of clarity.

According to FIG. 14, an actuating subassembly C may comprise a simplex/duplex subassembly instead of the subassembly of FIG. 1. According to FIGS. 15 and 16, each calculation channel of the computers of the processing subassembly B communicates with each calculation channel of the computers of the actuating subassembly C via bidirectional links.

According to FIG. 17, a simplex/duplex subassembly may comprise a single secondary computer. Thus, a simplified architecture may comprise an optional piloting command acquisition subassembly A provided with two primary computers and two secondary computers, a processing subassembly B having three simplex computers and one duplex computer, and one actuating subassembly C per actuator 30 comprising two duplex computers.

Naturally, the present disclosure may be subjected to numerous variations as to its implementation. Although several embodiments are described above, it should readily be understood that it is not conceivable to identify exhaustively all the possible embodiments. It is of course possible to replace any of the means described with equivalent means without going beyond the ambit of the present disclosure and the claims.

What is claimed is:

1. An electrical flight control system for controlling an aircraft, the flight control system comprising a plurality of functional subassemblies, the plurality of functional subassemblies comprising a processing subassembly determining at least one positional setpoint to be achieved by at least one aerodynamic control surface as a function of at least one command, the plurality of functional subassemblies comprising at least one actuating subassembly configured to generate, as a function of the positional setpoint, at least one actuation setpoint that is transmitted to at least one actuator, wherein each functional subassembly comprises at least one primary computer and at least one secondary computer that are dissimilar, at least one functional subassembly being a simplex/duplex subassembly comprising at least three identical simplex primary computers and at least one duplex secondary computer, each duplex secondary computer of a simplex/duplex subassembly comprising independent and synchronized control calculation channel and monitoring calculation channel, each simplex primary computer of a simplex/duplex subassembly having a single calculation channel, and wherein, except in the event of failure, the three primary computers of a simplex/duplex subassembly form two virtual pseudo-duplex computers.

2. The electrical flight control system according to claim 1, wherein the simplex/duplex subassembly comprises three identical simplex primary computers and two identical duplex secondary computers.

3. The electrical flight control system according to claim 1, wherein the flight control system comprises a plurality of actuators, the plurality of functional subassemblies comprising one actuating subassembly per actuator.

4. The electrical flight control system according to claim 1, wherein the flight control system comprises an antenna configured to receive the command and transmit it to the processing subassembly, or the flight control system comprises an autopilot device configured to generate the command and transmit it to the processing subassembly.

5. The electrical flight control system according to claim 1, wherein a piloting command acquisition subassembly comprises:

two identical simplex primary computers as well as two identical simplex secondary computers that are dissimilar from the two simplex primary computers, the two primary computers and the two secondary computers of the piloting command acquisition subassembly each acquiring the command, the two primary computers and the two secondary computers of the piloting command acquisition subassembly each having a single calculation channel; or a simplex/duplex subassembly, at least two primary computers and each secondary computer of the piloting command acquisition subassembly acquiring the command, except in the event of failure; or two identical duplex primary computers as well as two identical duplex secondary computers that are dissimilar from the two duplex primary computers, the two duplex primary computers and the two duplex secondary computers of the piloting command acquisition subassembly each acquiring the command and each having independent control calculation channel and monitoring calculation channel; or a duplex primary computer and a duplex secondary computer that are dissimilar, the duplex primary computer and the duplex secondary computer of the piloting command acquisition subassembly each acquiring the command and each having independent control calculation channel and monitoring calculation channel.

6. The electrical flight control system according to claim 1, wherein the actuating subassembly comprises:

a simplex/duplex subassembly, at least two primary computers and each secondary computer of the actuating subassembly each generating, except in the event of failure, an actuating setpoint; or two identical duplex primary computers and two identical duplex secondary computers that are dissimilar from the two primary computers, the two duplex primary computers and the two duplex secondary computers of the actuating subassembly each generating an actuation setpoint and each having independent control calculation channel and monitoring calculation channel; or a duplex primary computer and a duplex secondary computer that are dissimilar, the duplex primary computer and the duplex secondary computer of the actuating subassembly each generating an actuation setpoint and each having independent control calculation channel and monitoring calculation channel.

7. The electrical flight control system according to claim 1, wherein each primary computer of the processing subassembly is connected by at least one bidirectional primary link to each computer of the actuating subassembly, each secondary computer of the processing subassembly is connected by at least one bidirectional secondary link to each computer of the actuating subassembly, each bidirectional primary link being different from each bidirectional secondary link.

8. The electrical flight control system according to claim 1, wherein the computers of the processing subassembly communicate with each other via a plurality of intercomputer links.

9. The electrical flight control system according to claim 1, wherein the at least three primary computers of a simplex/duplex subassembly form two virtual pseudo-duplex computers by being configured as follows: a first primary computer is configured to generate a first order, a second primary computer is configured to generate a second order and to monitor the first primary computer in a manner that is not synchronized with the first primary computer, and a third primary computer is configured to monitor the first primary computer and the second primary computer in an unsynchronized manner.

10. The electrical flight control system according to claim 9, wherein, in the event of failure of a primary computer of a simplex/duplex subassembly, each of the two operating primary computers of this simplex/duplex subassembly automatically reconfigure to respectively generate the first order and the second order, and monitor the other primary computer.

11. The electrical flight control system according to claim 1, wherein the plurality of functional subassemblies comprises at least one piloting command acquisition subassembly for acquiring the command from an operation of an associated piloting member that can be operated by a pilot.

12. The electrical flight control system according to claim 11, wherein: i) the processing subassembly comprises a simplex/duplex subassembly having two secondary computers, two primary computers and each secondary computer of the processing subassembly each generating, except in the event of failure, the positional setpoint; ii) the piloting command acquisition subassembly comprises two identical simplex primary computers and two identical simplex secondary computers that are dissimilar from the two primary computers of the piloting command acquisition subassembly, the two primary computers and the two secondary computers of the piloting command acquisition subassembly each generating the command, the two simplex primary computers and the two simplex secondary computers of the piloting command acquisition subassembly each having a single calculation channel; and iii) the actuating subassembly comprises two identical duplex primary computers and two identical duplex secondary computers that are dissimilar from the two primary computers of the actuating subassembly, the two duplex primary computers and the two duplex secondary computers of the actuating subassembly each generating an actuation setpoint and each having independent control calculation channel and monitoring calculation channel.

13. The electrical flight control system according to claim 1, wherein the processing subassembly comprises a simplex/duplex subassembly, at least two primary computers and each secondary computer of the processing subassembly each generating the positional setpoint, except in the event of failure.

14. The electrical flight control system according to claim 13, wherein the primary and secondary computers of each actuating subassembly communicate with each other and are configured to determine a positional setpoint to be applied from among the positional setpoints transmitted by the processing subassembly as a function of a stored selection logic.

15. The electrical flight control system according to claim 13, wherein the plurality of functional subassemblies comprises at least one piloting command acquisition subassembly for acquiring the command from an operation of an associated piloting member that can be operated by a pilot and wherein each computer of the piloting command acquisition subassembly is connected by at least one first control link to each primary computer of the processing subassembly, each computer of the piloting command acquisition subassembly being connected by at least one second control link to each control calculation channel and to each monitoring calculation channel of each secondary computer of the processing subassembly, each first control link being dissimilar from each second control link.

16. An aircraft provided with at least one movable aerodynamic control surface for steering the aircraft, wherein the aircraft comprises the electrical flight control system according to claim 1.

* * * * *